United States Patent
Ozaki et al.

(10) Patent No.: US 11,318,904 B2
(45) Date of Patent: May 3, 2022

(54) OCCUPANT PROTECTION DEVICE

(71) Applicant: TOYODA GOSEI CO., LTD., Kiyosu (JP)

(72) Inventors: Takenori Ozaki, Nagoya (JP); Shigeyuki Suzuki, Kiyosu (JP); Yasushi Masuda, Kiyosu (JP); Hajime Kitte, Kiyosu (JP); Kenichi Fukurono, Kiyosu (JP); Motoyuki Tanaka, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 142 days.

(21) Appl. No.: 16/656,826

(22) Filed: Oct. 18, 2019

(65) Prior Publication Data
US 2020/0122668 A1 Apr. 23, 2020

(30) Foreign Application Priority Data

Oct. 22, 2018 (JP) .............................. JP2018-198807
Sep. 27, 2019 (JP) .............................. JP2019-177697

(51) Int. Cl.
*B60R 21/18* (2006.01)
*B60R 22/26* (2006.01)
(Continued)

(52) U.S. Cl.
CPC .............. *B60R 21/18* (2013.01); *B60R 21/00* (2013.01); *B60R 21/20* (2013.01); *B60R 21/215* (2013.01);
(Continued)

(58) Field of Classification Search
CPC .................................................... B60R 21/18
See application file for complete search history.

(56) References Cited

U.S. PATENT DOCUMENTS 5,062,662 A * 11/1991 Cameron .............. B60R 21/268
280/733
5,871,230 A * 2/1999 Lewis ..................... B60R 21/18
280/733
(Continued)

FOREIGN PATENT DOCUMENTS

CN 101580048 A * 11/2009 ............. B60R 21/18
CN 104760561 A 7/2015
(Continued)

OTHER PUBLICATIONS

Chinese Office Action dated Oct. 9, 2021, issued in corresponding Chinese Patent Application No. 201911004825.X (and English machine translation).

*Primary Examiner* — Nicole T Verley
(74) *Attorney, Agent, or Firm* — Posz Law Group, PLC

(57) ABSTRACT

An occupant protection device which is configured to protect an occupant seated on a seat, includes a seat belt, an airbag, and an inflator configured to supply inflation gas to the airbag. The airbag has a bag shape formed of a flexible sheet body, the airbag is folded and stored in a storage part provided in a lap belt, the airbag is inflated so as to project toward a front upper side when the inflation gas flows into the airbag, and the airbag has a substantially triangular prism shape whose axial direction is substantially aligned with a left-right direction so as to include a leg abutting surface which is capable of abutting an upper surface of a leg of the occupant and an upper body restraining surface which is capable of restraining the occupant from a chest to a head, when the airbag is completely inflated.

6 Claims, 15 Drawing Sheets

(51) Int. Cl.
  *B60R 21/215* (2011.01)
  *B60R 21/20* (2011.01)
  *B60R 21/231* (2011.01)
  *B60R 21/00* (2006.01)
  *B60R 21/217* (2011.01)

(52) U.S. Cl.
  CPC .......... *B60R 21/217* (2013.01); *B60R 21/231* (2013.01); *B60R 22/26* (2013.01); *B60R 2021/0048* (2013.01); *B60R 2021/21531* (2013.01)

(56) References Cited

U.S. PATENT DOCUMENTS

| | | | |
|---|---|---|---|
| 6,293,582 | B1 | 9/2001 | Lewis |
| 2002/0011723 | A1 | 1/2002 | Lewis |
| 2005/0230945 | A1* | 10/2005 | Watanabe ............... B60R 21/18 280/733 |
| 2006/0028004 | A1* | 2/2006 | Oota ..................... B60R 21/231 280/733 |
| 2009/0179406 | A1* | 7/2009 | Haraoka ................. B60R 21/18 280/733 |
| 2009/0256337 | A1* | 10/2009 | Pan ........................ B60R 21/18 280/733 |
| 2009/0278340 | A1* | 11/2009 | Azuma ............... B60R 21/0136 280/733 |
| 2010/0025972 | A1* | 2/2010 | Nezaki .................... B60R 22/26 280/730.1 |
| 2013/0264803 | A1* | 10/2013 | Schneider ............... B60R 21/18 280/733 |
| 2014/0151986 | A1* | 6/2014 | Kim ....................... B60R 21/18 280/733 |
| 2014/0159350 | A1* | 6/2014 | Schneider ............... B60R 21/18 280/728.2 |
| 2015/0069741 | A1* | 3/2015 | Shimazu ................. B60R 21/18 280/728.3 |
| 2016/0059814 | A1* | 3/2016 | Schneider ......... B60N 2/42718 280/733 |
| 2016/0075299 | A1* | 3/2016 | Wang ..................... B60R 21/18 280/728.2 |
| 2018/0272981 | A1* | 9/2018 | Nagasawa .............. B60R 21/18 |
| 2019/0016288 | A1* | 1/2019 | Schneider ......... B60R 21/23138 |
| 2021/0094504 | A1* | 4/2021 | Tanaka ............. B60R 21/23138 |
| 2021/0129785 | A1* | 5/2021 | Fischer ................. B60R 21/233 |

FOREIGN PATENT DOCUMENTS

| | | | | |
|---|---|---|---|---|
| DE | 29921162 | U1 | * 4/2000 | ........... B60R 21/18 |
| DE | 10065464 | A1 | * 8/2001 | ............ B60N 2/888 |
| DE | 102015204099 | A1 | * 9/2016 | ........... B60R 21/18 |
| EP | 1016568 | A1 | * 7/2000 | ........... B60R 21/18 |
| EP | 1616760 | A1 | * 1/2006 | ........... B60R 21/18 |
| EP | 2116429 | A1 | * 11/2009 | ........... B60R 21/18 |
| EP | 3546297 | A1 | * 10/2019 | .......... B60R 21/261 |
| JP | 10129410 | A | * 5/1998 | ....... B60R 21/01546 |
| JP | 2002-505226 | A | 2/2002 | |
| JP | 2006-44614 | A | 2/2006 | |
| JP | 2006027402 | A | * 2/2006 | |
| JP | 2008296722 | A | * 12/2008 | |
| JP | 2008302906 | A | * 12/2008 | |
| JP | 2009166774 | A | * 7/2009 | |
| JP | 4487665 | B2 | * 6/2010 | |
| JP | 4747836 | B2 | * 8/2011 | |
| JP | 4792935 | B2 | * 10/2011 | |
| JP | 4811130 | B2 | * 11/2011 | |
| JP | 2015-51744 | A | 3/2015 | |
| JP | 2019064537 | A | * 4/2019 | |
| WO | WO-0053461 | A1 | * 9/2000 | ........... B60R 21/18 |
| WO | WO-0100456 | A1 | * 1/2001 | ........... B60R 21/18 |
| WO | WO-2007052437 | A1 | * 5/2007 | ......... B60R 21/217 |
| WO | WO-2007069398 | A1 | * 6/2007 | ........... B60R 21/18 |
| WO | WO-2008110448 | A1 | * 9/2008 | ........ B60R 21/0134 |

\* cited by examiner

A-A PARTIAL SCHEMATIC CROSS SECTION

OCCUPANT PROTECTION DEVICE

CROSS-REFERENCE TO RELATED APPLICATIONS

This application is based upon and claims the benefit of priority from prior Japanese patent application No. 2018-198807, filed on Oct. 22, 2018 and Japanese patent application No. 2019-177697, filed on Sep. 27, 2019, the entire contents of which are incorporated herein by reference.

TECHNICAL FIELD

The present invention relates to an occupant protection device which is configured to protect an occupant seated on a seat.

BACKGROUND ART

As a related art, an occupant protection device is available in which an airbag is disposed in an area of a lap belt in a seat belt, which restrains a waist of an occupant when being worn (see, for example, JP-A-2015-51744). In the occupant protection device, the airbag is inflated so as to project forward and upward from the lap belt when being deployed and inflated, and has a substantial plate shape to cover a front of a head of the occupant when the airbag is completely inflated.

In the related-art occupant protection device, the airbag is inflated in a substantial plate shape. Therefore, an occupant restrained by the seat belt moves an upper body largely so as to approach a lower body, the airbag disposed between the upper body and the lower body is inclined forward and compressed, so that it is difficult to accurately protect the upper body of the occupant by the airbag.

The present invention solves the above-described problem, and an aspect of the present invention is to provide an occupant protection device capable of accurately protecting an upper body of an occupant by an airbag that is completely inflated even when the upper body is moved largely so as to approach a lower body.

SUMMARY OF INVENTION

According to an aspect of the invention, there is provided an occupant protection device which is configured to protect an occupant seated on a seat, the occupant protection device comprising: a seat belt; an airbag which is disposed in an area of a lap belt of a seat belt, the lap belt configured to restrain a waist of the occupant when being worn; and an inflator which is configured to supply inflation gas to the airbag, wherein the airbag has a bag shape formed of a flexible sheet body, the airbag is folded and stored in a storage part provided in the lap belt, the airbag is inflated so as to project toward a front upper side when the inflation gas flows into the airbag, and the airbag has a substantially triangular prism shape whose axial direction is substantially aligned with a left-right direction so as to include a leg abutting surface which is capable of abutting an upper surface of a leg of the occupant and an upper body restraining surface which is capable of restraining the occupant from a chest to a head, when the airbag is completely inflated.

DESCRIPTION OF EMBODIMENTS

Figure 1:
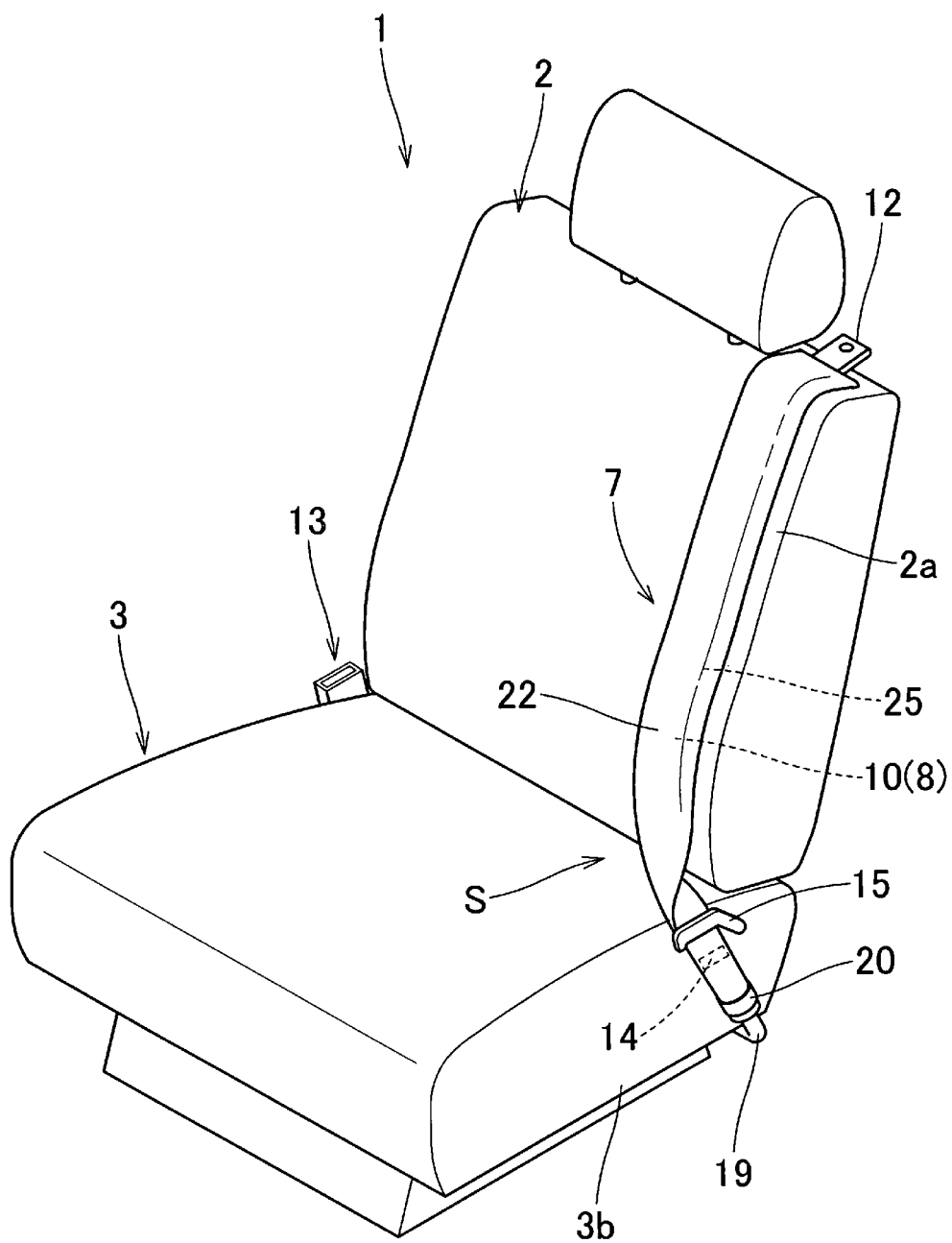
FIG. 1 is a perspective view of a seat on which an occupant protection device according to an embodiment of the present invention is mounted.
Figure 2:
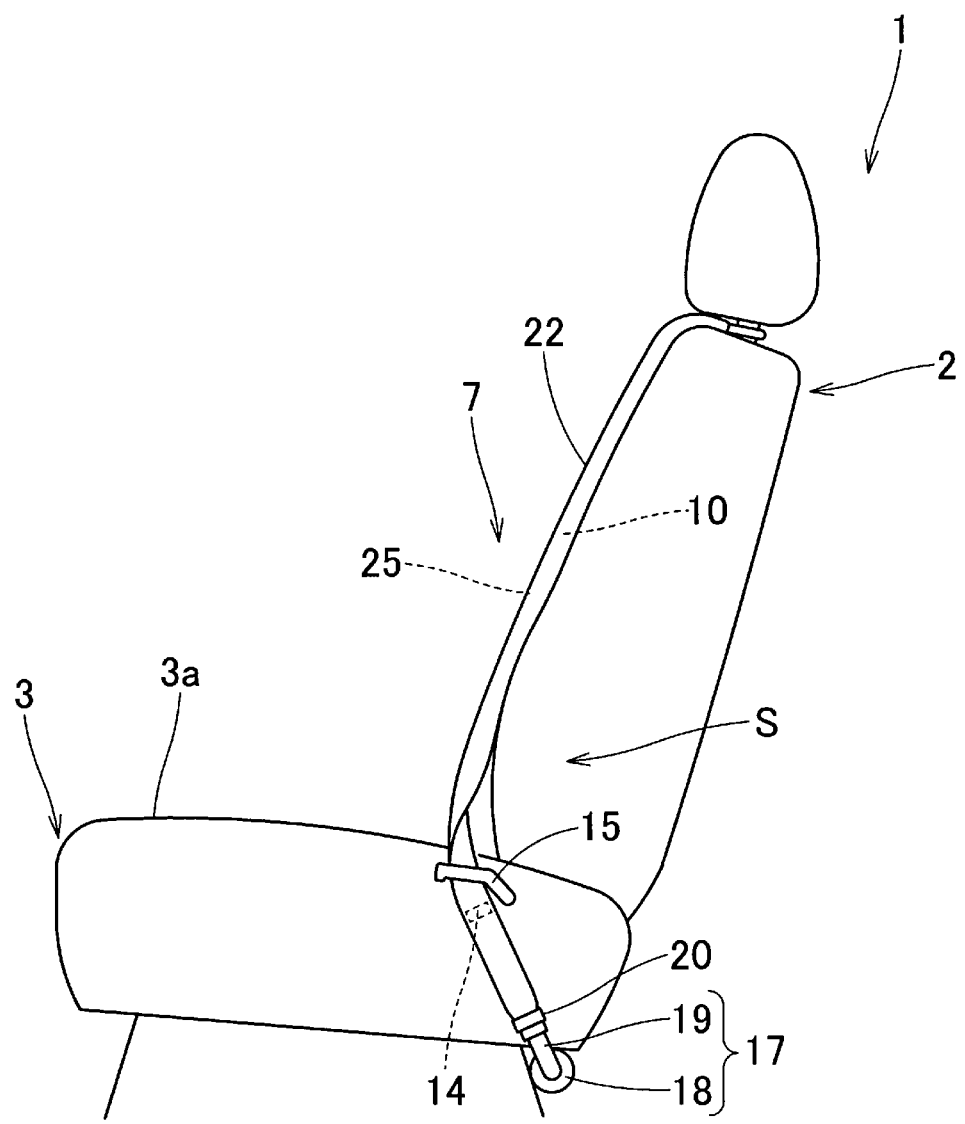
FIG. 2 is a side view of the seat in FIG. 1.
Figure 3:
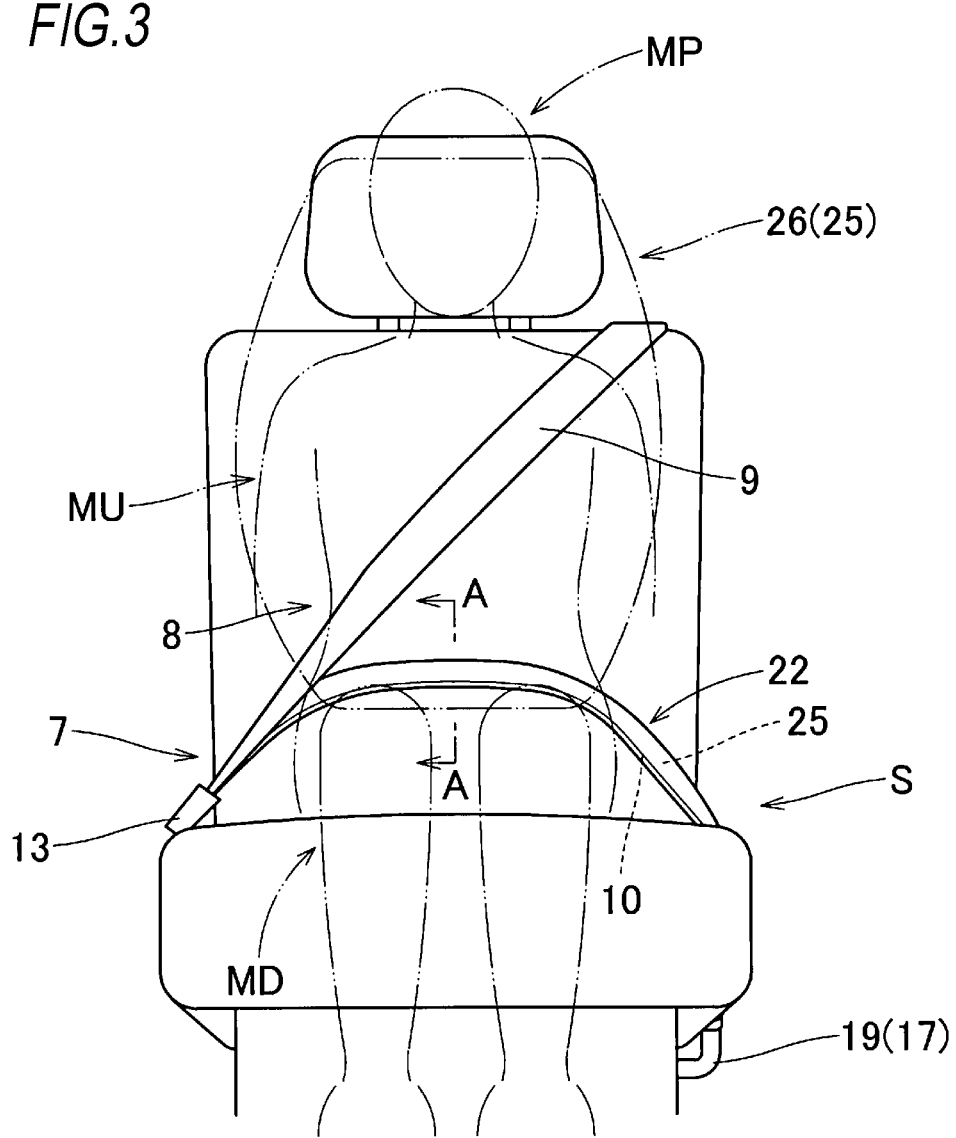
FIG. 3 is a front view of the seat in FIG. 1 illustrating a state where a seat belt is worn.
Figure 3:
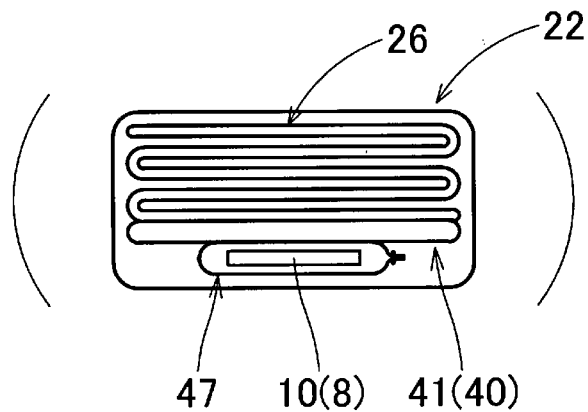

An embodiment of the present invention will be described below with reference to the drawings. As illustrated in FIGS. 1 to 3, an occupant protection device S according to the embodiment is mounted on a seat 1 of a vehicle, and includes a seat belt 7, an airbag 25, and an inflator 17. The seat 1 includes a backrest portion 2 and a seat portion 3.

The seat belt 7 includes a belt body 8 which is configured to restrain an occupant MP seated on the seat 1, a tongue plate 12 which is attached to the belt body 8, and a buckle 13 which is configured to connect the tongue plate 12. One end of the belt body 8 is locked to a winding shaft of a retractor (not illustrated) disposed in the backrest portion 2, and the other end side of the belt body 8 is locked to an anchor member 14 (see FIG. 1) disposed on a left side of a rear end 3b of the seat portion 3 in the seat 1. Specifically, the belt body 8 is disposed so as to be exposed to outside from an upper left edge side of the backrest portion 2. Therefore, in the embodiment, as illustrated in FIGS. 1 and 2, a lap belt 10 in which the airbag 25 is disposed is exposed on a front surface of the backrest portion 2 when an occupant is not seated. The belt body 8 includes the lap belt 10 and a shoulder belt 9 which is stored in the backrest portion 2. When the occupant is seated, a lower body MD (a waist) of the occupant MP is restrained by the lap belt 10 which is disposed to be substantially aligned with a left-right direction between the anchor member 14 and the buckle 13 such that the tongue plate 12 is connected to the buckle 13, and an upper body MU (from a shoulder to a chest MB) of the occupant MP is restrained by the shoulder belt 9 which extends from the upper left edge side of the backrest portion 2 and is obliquely disposed and connected to the buckle 13 (see FIG. 3). Specifically, when the occupant MP is not seated, the lap belt 10 is exposed on the front surface of the backrest portion 2 so as to be substantially aligned with an upper-lower direction on a left edge 2a side of the backrest portion 2, as illustrated in FIG. 1.

In the embodiment, the inflator 17 is disposed at a position below a seat surface 3a of the seat 1. In the embodiment, as illustrated in FIG. 2, the inflator 17 includes a substantially cylindrical inflator main body 18 (detailed illustration is omitted) which is disposed on a back surface side below the seat portion 3 such that an axial direction of the inflator main body 18 is substantially aligned with the left-right direction, and a pipe portion 19 which extends from the inflator main body 18 to supply inflation gas to the airbag 25. The pipe portion 19 extends from the inflator main body 18 and is disposed such that a distal end of the pipe portion 19 is located in a vicinity of a boundary part of the seat portion 3 and the backrest portion 2 on a left side of the seat 1, and the distal end of the pipe portion 19 is connected to a conduit portion 40 described below in the airbag 25 using a clamp 20 (see FIGS. 1, 2, 9 and 10).

The airbag 25 is folded in an elongated shape and is disposed in an area of the lap belt 10 so as to be overlapped on an upper surface side of the lap belt 10 when the seat belt 7 is worn (see FIG. 3). That is, when the seat belt 7 is not worn as illustrated in FIG. 1, the airbag 25 is disposed on a back surface side (a backrest portion 2 side) of the lap belt 10. In the embodiment, as illustrated in FIG. 3, a periphery of the airbag 25 and the lap belt 10 is covered and integrated by a cover 22 which can be broken when the airbag 25 is deployed and inflated. That is, in the embodiment, a gap between the lap belt 10 and the cover 22 forms a storage part which stores the airbag 25.

Figure 4:
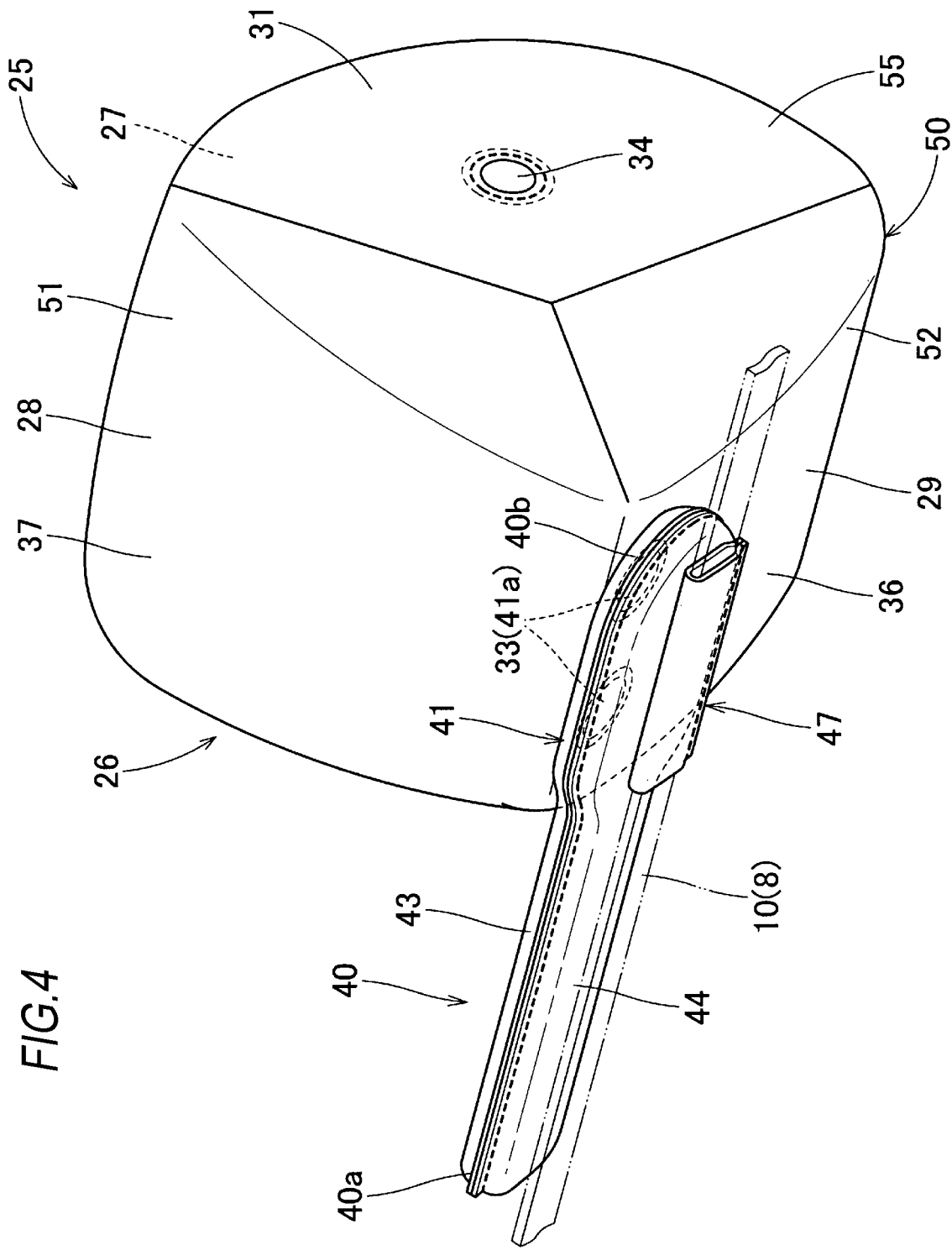
FIG. 4 is a schematic perspective view illustrating a state where an airbag used in the occupant protection device in FIG. 1 is inflated alone.
Figure 5:
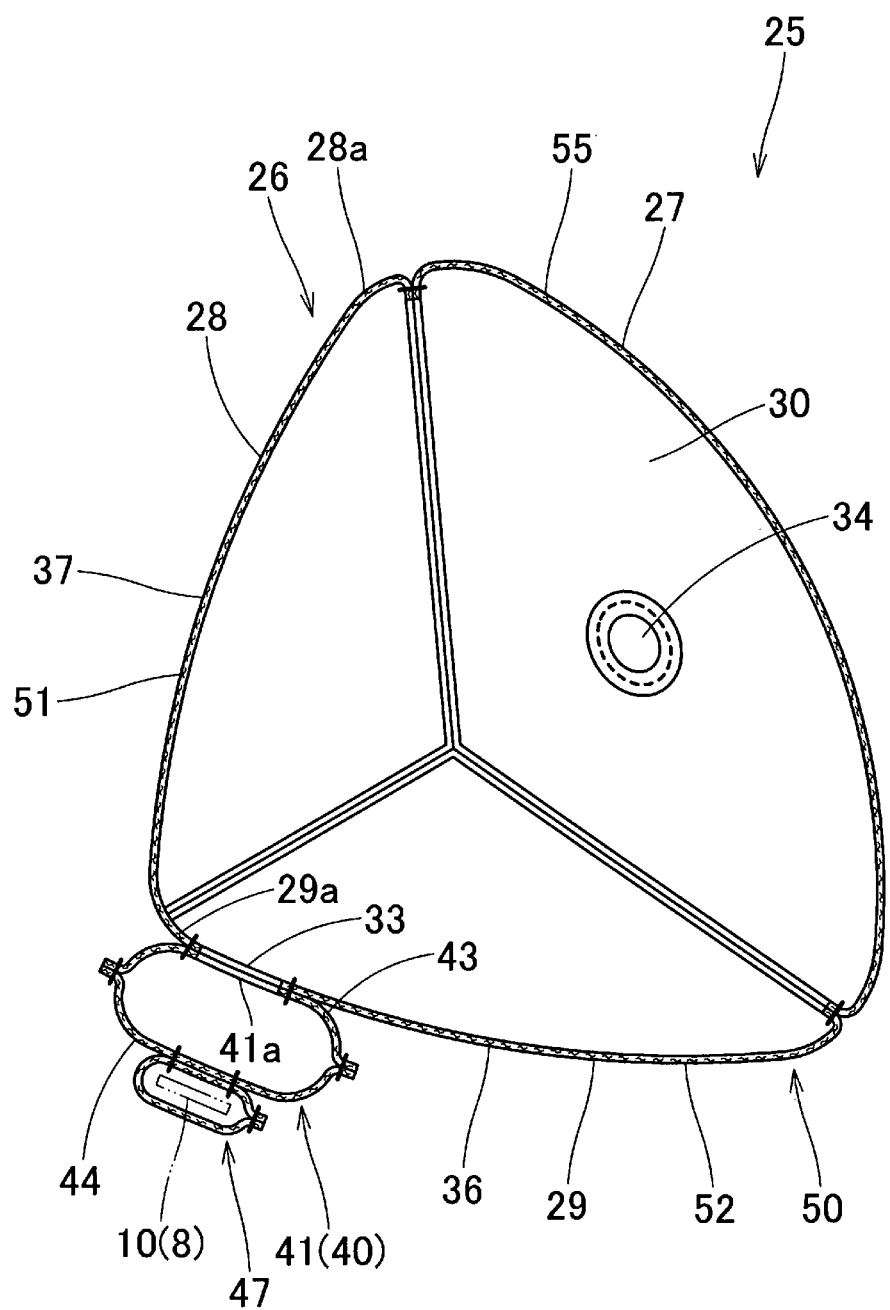
FIG. 5 is a schematic longitudinal sectional view of the airbag in FIG. 4.

As illustrated in FIGS. 4 and 5, the airbag 25 includes a bag main body 26, the conduit portion 40 which is connected to the inflator 17 to flow the inflation gas into the bag main body 26, and a belt attachment portion 47 through which the lap belt 10 is inserted.

The bag main body 26 has an outer shape which is a substantially triangular prism shape whose axial direction is substantially aligned with the left-right direction when the airbag 25 is completely inflated. More specifically, the bag main body 26 has a substantially right-angled triangular shape having a hypotenuse on a front side as viewed from left and right sides when the airbag 25 is completely inflated, and has a substantially rectangular shape which is wider in the upper-lower direction as viewed form sides in a front-rear direction when the airbag 25 is completely inflated (see FIGS. 8 and 9). The bag main body 26 includes a front wall portion 27 which is disposed on a front side away from the occupant MP when the bag main body 26 is completely inflated, a rear upper wall portion 28 and a rear lower wall portion 29 which are disposed on an occupant MP side when the bag main body 26 is completely inflated, and a left wall portion 30 and a right wall portion 31 which are disposed to face each other on sides in the left-right direction when the bag main body 26 is completely inflated. The bag main body 26 includes communication holes 33 communicating with the conduit portion 40 on a lower surface side of a rear end 29a of the rear lower wall portion 29, and is connected to the conduit portion 40 at a peripheral part of the communication holes 33. In the embodiment, the two communication holes 33 open in a circular shape and are disposed side by side in the left-right direction so as to be substantially symmetrical in the left-right direction with respect to a center of the bag main body 26 in the left-right direction. Vent holes 34, 34 which are configured to exhaust excess inflation gas are formed in a vicinity of a center of each of a left edge side and a right edge side of the front wall portion 27 in the upper-lower direction. In the bag main body 26 according to the embodiment, the rear lower wall portion 29 forms a leg abutting surface 36 which can abut against an upper surface of a leg of the occupant MP when the airbag 25 is completely inflated, and the rear upper wall portion 28 forms an upper body restraining surface 37 which is disposed in front of the occupant MP when the airbag 25 is completely inflated and can restrain the occupant MP from a chest to a head. In the embodiment, the rear upper wall portion 28 and the rear lower wall portion 29 have a substantially rectangular outer shape when the bag main body 26 is completely inflated in which a longitudinal direction is substantially aligned with a side in the front-rear direction or a side in the upper-lower direction, and width dimensions of sides in the longitudinal direction coincide with each other as illustrated in FIG. 5. An upper end 28a of the rear upper wall portion 28 is positioned in front of the head of the occupant when the bag main body is completely inflated (see FIG. 9). The rear upper wall portion 28 and the rear lower wall portion 29 are disposed so as to be substantially orthogonal to each other in a cross-sectional shape when the bag main body 26 is completely inflated (see FIG. 5).

The conduit portion 40, in which a leading end 40b side connected to the bag main body 26 is closed and a base portion 40a side is opened to be connectable to the pipe portion 19, is connected to the pipe portion 19 of the inflator 17 and is disposed along the left-right direction that is substantially aligned with the lap belt 10 when the airbag 25 is completely inflated. As illustrated in FIG. 4, the conduit portion 40 has an area in the leading end 40b side disposed at a lower surface side of the bag main body 26 when the bag main body 26 is completely inflated, and the area in the leading end 40b side is wide and includes a gas storage portion 41 which is configured to temporarily store the inflation gas flowing therein. As described above, the base portion 40a side of the conduit portion 40 is connected to the pipe portion 19 of the inflator 17 using the clamp 20 as described above. In the embodiment, an outer surface side (a left surface side in the embodiment) of an area in a vicinity of the base portion 40a in the conduit portion 40 is pressed by a pressing piece portion 15 (see FIGS. 1, 2, 9 and 10). A width dimension of the gas storage portion 41 is set to about twice a width dimension of a part of the conduit portion 40 on the base portion 40a side. A width dimension of sides of the gas storage portion 41 in the left-right direction is substantially the same as a width dimension of sides of a part (in a vicinity of a disposing part of the communication hole 33) of a rear lower edge side of the bag main body 26 in the left-right direction (see FIGS. 4 and 6). An opening 41a corresponding to the communication hole 33 formed in the bag main body 26 is formed in the gas storage portion 41. In the embodiment, the conduit portion 40 has a cylindrical shape by connecting peripheral edges of an upper wall portion 43 and a lower wall portion 44 having the same outer shape, and the opening 41a is formed in an area of the upper wall portion 43. An entire peripheral edge of the opening 41a is joined (sewn) to a peripheral edge of the communication hole 33.

The belt attachment portion 47 is disposed on a lower surface side (a lower wall portion 44 side) of an area of the gas storage portion 41 of the conduit portion 40, and is sewn to the lower wall portion 44 in a substantially cylindrical shape in which both end sides of the belt attachment portion 47 are opened such that the lap belt 10 can be inserted (see FIGS. 4 and 5). A length dimension of the belt attachment portion 47 is set to be slightly smaller than the width dimension of the sides of the gas storage portion 41 in the left-right direction. That is, the belt attachment portion 47 is set to have a large length dimension of sides in a direction along the lap belt 10 so as to reduce or prevent excessive lifting of the bag main body 26 from the lap belt 10 when the bag main body 26 is deployed and inflated.

The airbag 25 according to the embodiment is formed by joining peripheral edges of base fabrics each having a predetermined shape, and in the embodiment, as illustrated in FIG. 5, the airbag 25 is formed by an occupant side panel 50 forming the bag main body 26, a front side panel 55, two conduit portion panels 57, 58 forming the conduit portion 40, and a belt attachment panel 60 forming the belt attachment portion 47. The occupant side panels 50, the front side panel 55, the conduit portion panels 57, 58, and the belt attachment panel 60 are each formed of a flexible woven fabric formed of a polyester yarn, a polyamide yarn, or the like.

The occupant side panel 50 is disposed on the occupant MP side when the bag main body 26 is completely inflated, forms a part from the leg abutting surface 36 to the upper body restraining surface 37, and mainly forms a part from the rear upper wall portion 28 to the rear lower wall portion 29 in the bag main body 26 when the bag main body 26 is completely inflated. Specifically, the occupant side panel 50 includes a lower side part 52 mainly forming the leg abutting surface 36 (the rear lower wall portion 29) and an upper side part 51 mainly forming the upper body restraining surface (the rear upper wall portion 28). Specifically, the lower side part 52 forms the rear lower wall portion 29 and an area on a rear lower side of the left wall portion 30 and the right wall portion 31, the upper side part 51 forms the rear upper wall portion 28 and an area on a rear upper side of the left wall portion 30 and the right wall portion 31, and each of the lower side part 52 and the upper side part 51 has a substantially hexagonal outer shape. The occupant side panel 50 has an outer shape such that one side of the lower side part 52 and one side of the upper side part 51 are connected, and the lower side part 52 and the upper side part 51 are symmetrical with respect to a connecting part 50a.

Figure 7:
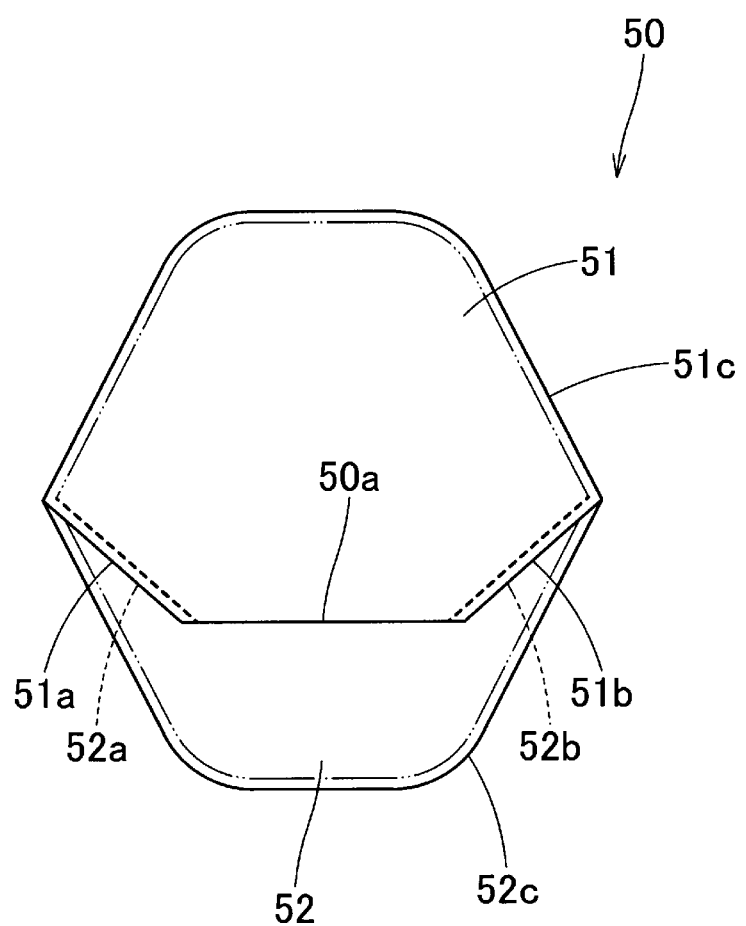
FIG. 7 is a top view illustrating a state where an upper side part and a lower side part of the occupant side panel are opened and flattened such that rear left edges are connected to each other, rear right edges are connected to each other, and front edges are separated from each other, in the base fabric forming the airbag in FIG. 4.

The front side panel 55 mainly forms the front wall portion 27 in the bag main body 26 when the bag main body 26 is completely inflated, and specifically forms the front wall portion 27 and an area on a front side of the left wall portion 30 and the right wall portion 31. The front side panel 55 has an outer shape which is a substantially hexagonal shape. Specifically, the front side panel 55 has a hexagonal shape that substantially matches the lower side part 52 and the upper side part 51 (see FIG. 7) which are opened so as to separate edges (front edges 51c, 52c) except rear left edges 51a, 52a and rear right edges 51b, 52b. The rear left edges 51a, 52a and the rear right edges 51b, 52b are respectively joined with each other and are disposed on left and right sides of the connecting part 50a of the occupant side panel 50.

Figure 6:
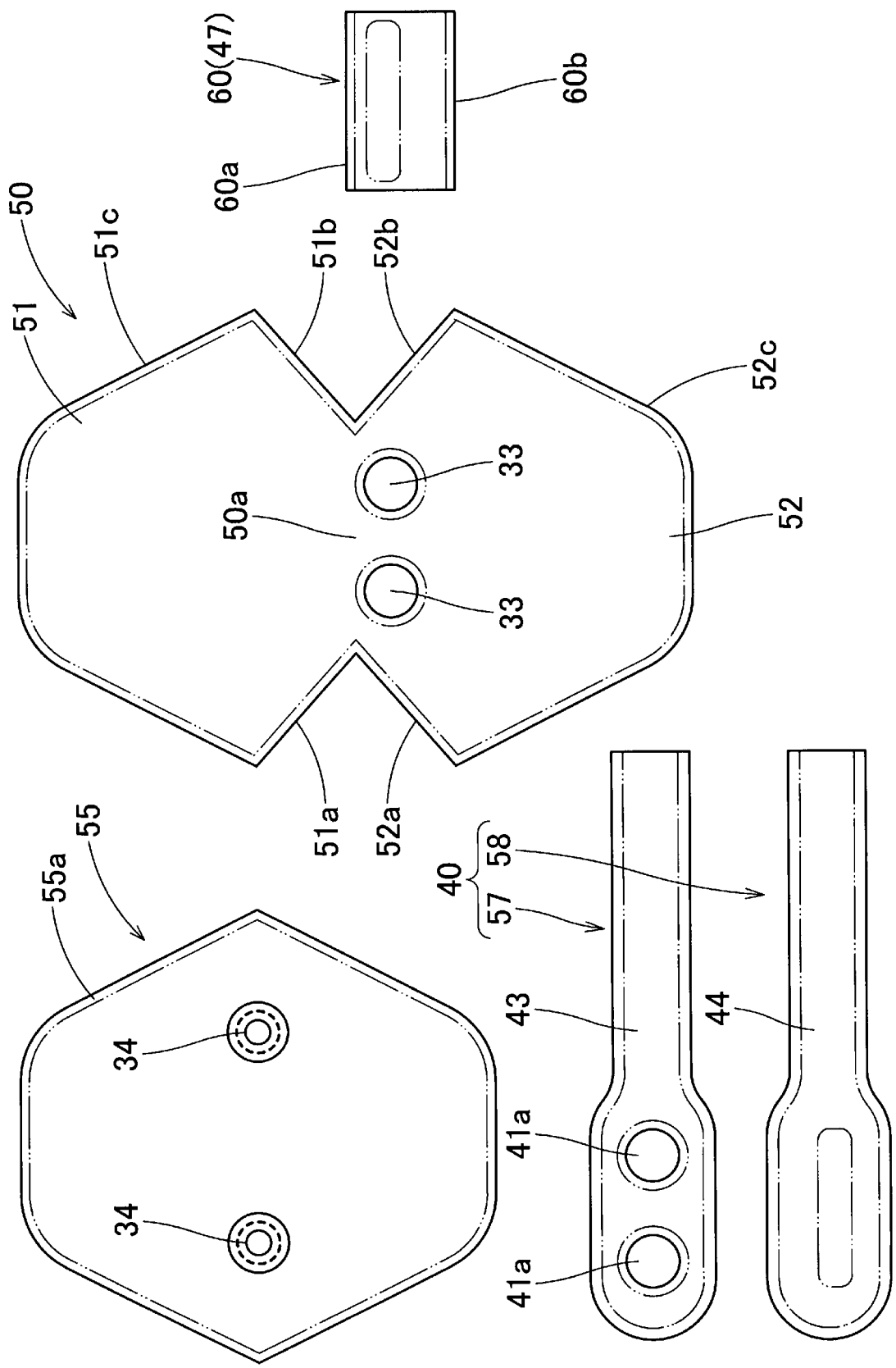
FIG. 6 is a top view illustrating a base fabric forming the airbag in FIG. 4.

As illustrated in FIG. 6, the two conduit portion panels 57, 58 has the same outer shape, and form the upper wall portion 43 and the lower wall portion 44 in the conduit portion 40, respectively. The belt attachment panel 60 has a substantially rectangular outer shape, and is folded in half to join edges 60a, 60b on a short side direction side with each other to form the belt attachment portion 47.

Next, manufacturing of the airbag 25 according to the embodiment will be described.

First, the belt attachment panel 60 is joined to the one conduit portion panel 58, and then the edges 60a, 60b on the short side direction side of the belt attachment panel 60 are joined with each other to form the belt attachment portion 47. The other conduit portion panel 57 is joined to the lower side part 52 in the occupant side panel 50 using a suture thread at the peripheral part of the communication hole 33, and the communication hole 33 and the opening 41a are bored. Thereafter, the peripheral edges of the conduit portion panels 57, 58 except for leading end side are joined to each other to form the conduit portion 40. Next, the upper side part 51 and the lower side part 52 of the occupant side panel 50 are folded back at the connecting part 50a such that the peripheral edges are aligned with each other, and the rear left edges 51a, 52a and the rear right edges 51b, 52b are sewn (joined) with each other using a suture thread, respectively. Thereafter, the upper side part 51 and the lower side part 52 are opened such that the front edges 51c, 52c, which are the excepted edges, are separated from each other (see FIG. 7), the flattened front side panel 55 is overlapped such that the outer peripheral edge 55a is aligned with the front edges 51c, 52c, and the front edges 51c, 52c and the outer peripheral edge 55a are sewn (joined) to each other using a suture thread, so that the bag main body 26 having a bag shape can be formed and the airbag 25 can be manufactured. That is, in the embodiment, the bag main body 26 can be manufactured by a planar joining operation.

Figure 8:
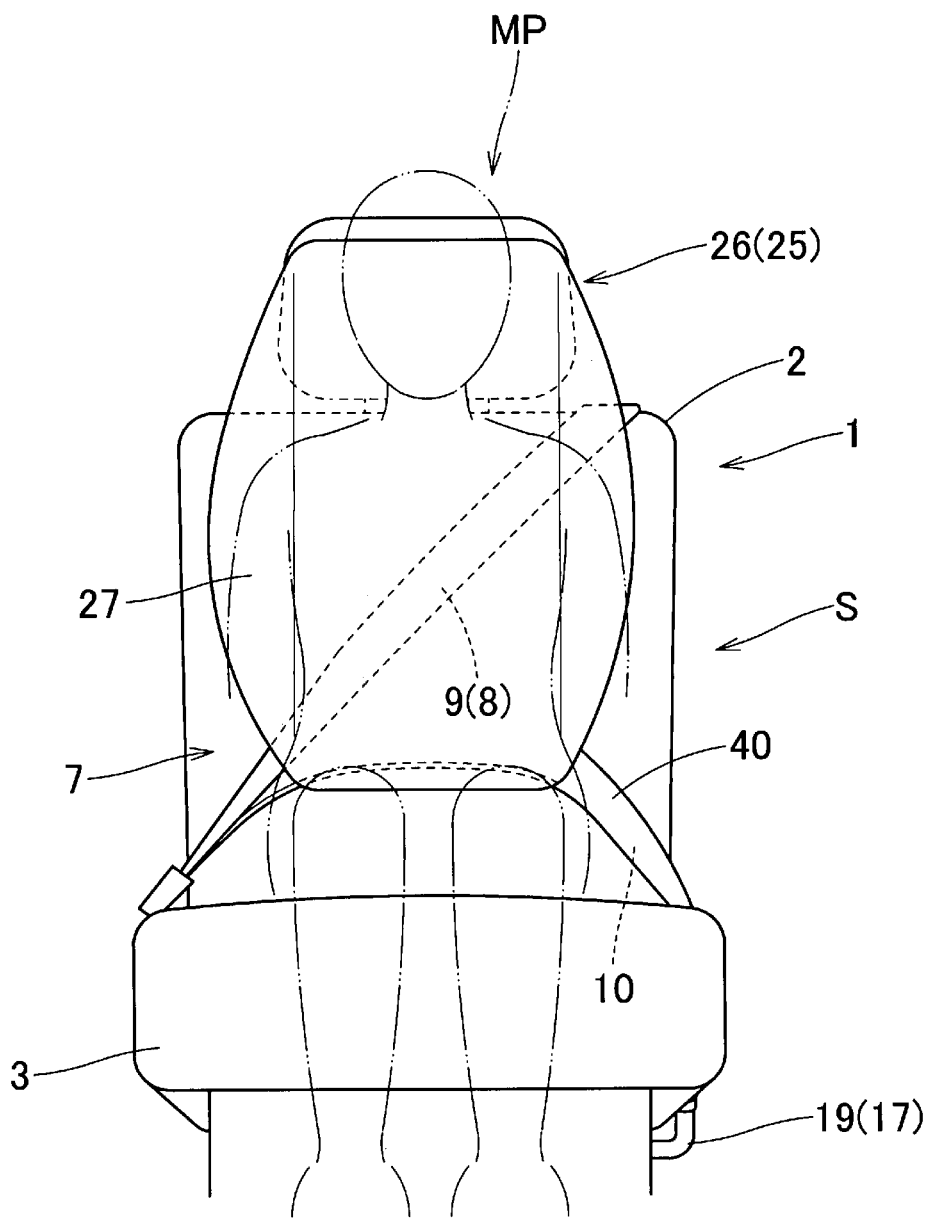
FIG. 8 is a front view of the seat in a state where the airbag is completely inflated in the occupant protection device according to the embodiment.
Figure 9:
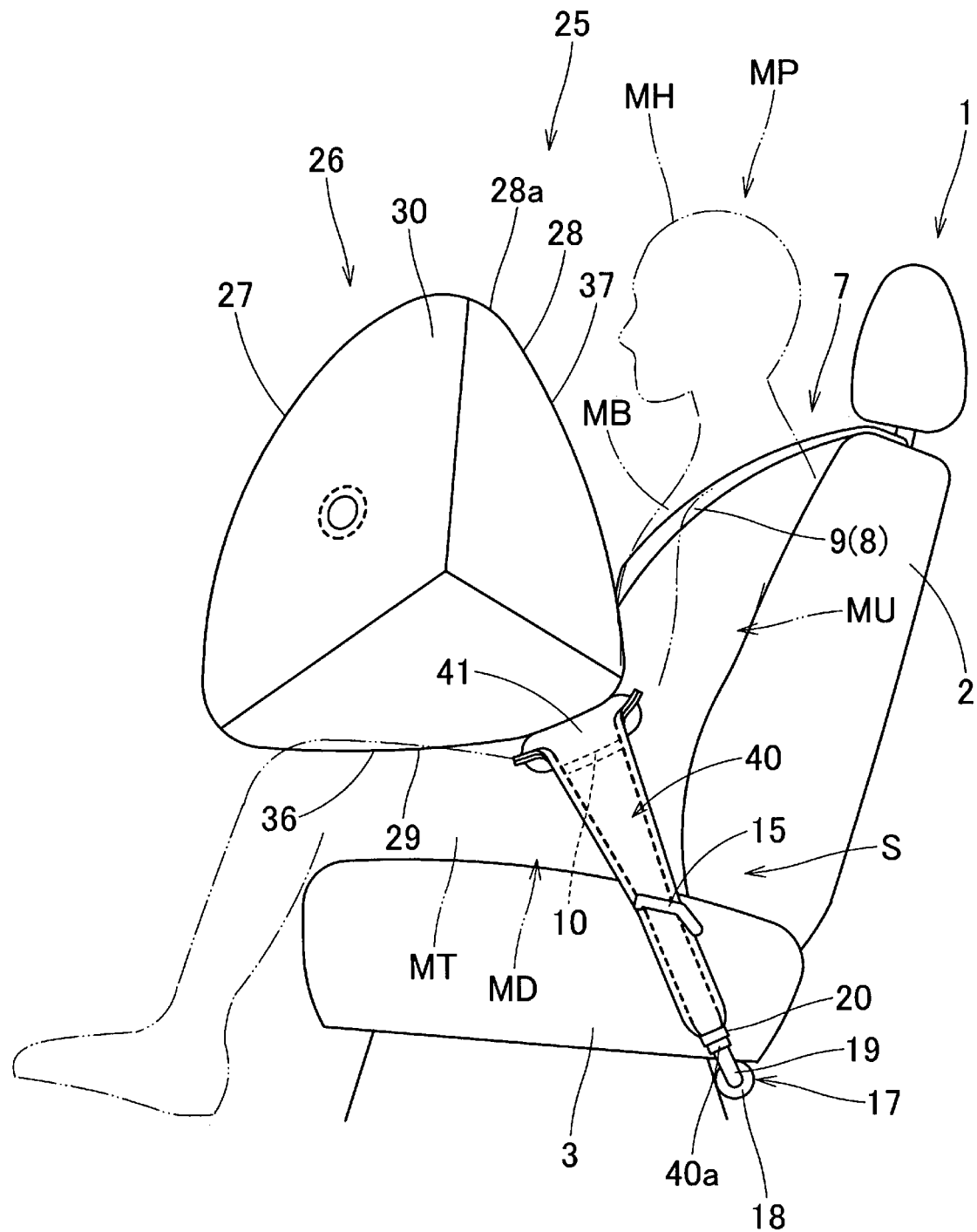
FIG. 9 is a side view of the seat in the state where the airbag is completely inflated in the occupant protection device according to the embodiment.

In the occupant protection device S according to the embodiment, when the occupant protection device S is mounted on the vehicle and the inflator 17 is operated, the inflation gas discharged from the inflator 17 flows into the bag main body 26 through the conduit portion 40, so that the bag main body 26 breaks the cover 22 and is completely inflated while projecting forward and upward from the lap belt 10, as illustrated in FIGS. 8 and 9.

Figure 10:
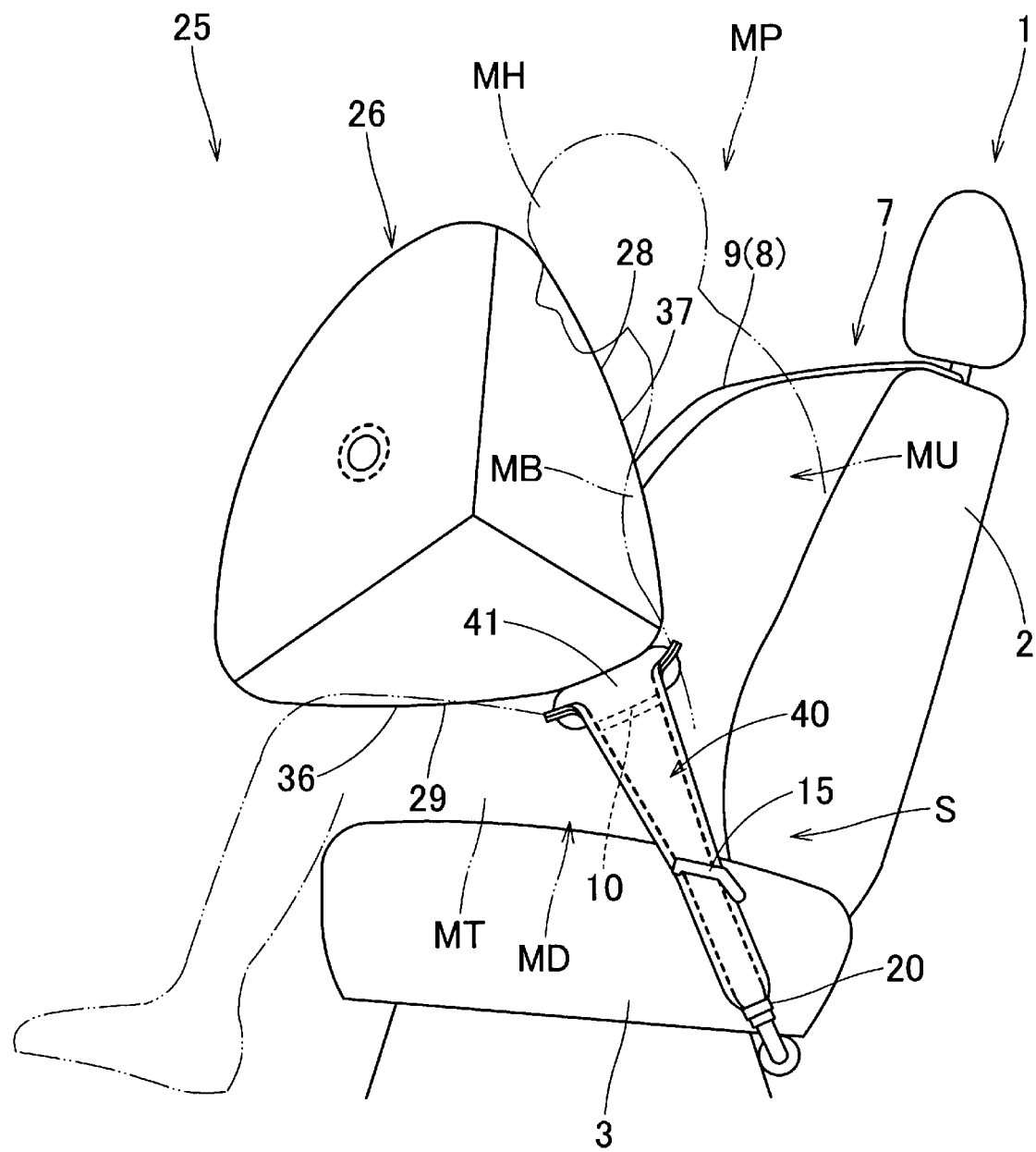
FIG. 10 is a side view illustrating a state where an occupant is restrained by the airbag that is completely inflated in the occupant protection device according to the embodiment.

In the occupant protection device S according to the embodiment, the airbag 25 (the bag main body 26) has a substantially triangular prism shape whose axial direction is substantially aligned with the left-right direction when the airbag 25 is completely inflated, and is disposed on a front side of the upper body MU of the occupant MP while abutting the leg abutting surface 36 with an upper surface of a leg MT. Therefore, when the airbag 25 is completely inflated, as illustrated in FIG. 10, even if the upper body MU of the occupant MP largely moves closer to the lower body MD, the leg abutting surface 36 is supported by the leg MT in a large area. Therefore, falling or compression of the airbag 25 can be reduced or prevented, and the upper body MU (from the chest MB to the head MH) of the occupant MP can be accurately restrained by the upper body restraining surface 37 disposed to face the front side of the upper body MU. Further, in the occupant protection device S according to the embodiment, the airbag 25 (the bag main body 26) has a substantially triangular prism shape when the airbag 25 is completely inflated. Therefore, the upper body MU can be accurately restrained by the upper body restraining surface 37 even when the occupant MP is seated on a seat with the backrest portion being inclined.

Therefore, in the occupant protection device S according to the embodiment, the upper body MU of the occupant MP can be accurately protected by the airbag 25 that is completely inflated even when the upper body MU is moved largely so as to approach the lower body MD.

In the occupant protection device S according to the embodiment, the seat belt 7 and the inflator 17 are mounted on the seat 1. Therefore, for example, the occupant MP seated on the seat 1 can be protected accurately even when the seat 1 is slid or rotated largely in the front-rear direction and is moved relative to the vehicle. If this aspect is not taken into consideration, a retractor may be provided on a vehicle body side or an inflator may be attached to a body side of the vehicle, as a seat belt mounted on a normal vehicle seat.

Specifically, in the occupant protection device S according to the embodiment, the inflator 17 is disposed at a position below the seat surface 3a of the seat 1, and the airbag 25 includes the bag main body 26 and the conduit portion 40 which is connected to the inflator 17 to flow the inflation gas into the bag main body 26. That is, in the occupant protection device S according to the embodiment, the inflator 17 is disposed at a position as far as possible from the occupant MP seated on the seat 1.

In the occupant protection device S according to the embodiment, in the conduit portion 40, the gas storage portion 41, which is capable of temporarily storing the inflation gas flowing into the gas storage portion 41, is disposed on the lower surface side of the bag main body 26 on the leading end 40b side when the bag main body 26 is completely inflated. The gas storage portion 41 and the bag main body 26 communicate with each other through a plurality of (two in the embodiment) the communication holes 33, 33 that are disposed on the sides in the left-right direction. Therefore, the inflation gas stored in the gas storage portion 41 flows into the bag main body 26 at substantially the same time from the communication holes 33, 33 formed side by side on the sides in the left-right direction. Therefore, it is possible to reduce or prevent the bag main body 26 from moving leftward and rightward and to inflate the bag main body 26 rapidly. If this aspect is not taken into consideration, only one communication hole may be provided, and the conduit portion may have a substantially constant width dimension up to a base portion side connected to the bag main body.

Further, in the occupant protection device S according to the embodiment, the bag main body 26 has a bag shape by connecting the peripheral edges of the occupant side panel 50 and the front side panel 55 disposed on the front side when the bag main body 26 is completely inflated. The occupant side panel 50 is disposed on the occupant MP side when the bag main body 26 is completely inflated and forms a part from the leg abutting surface 36 to the upper body restraining surface 37. The front side panel has a substantially hexagonal outer shape that substantially matches the lower side part 52 and the upper side part 51 which are opened so as to separate the front edges 51c, 52c except the rear left edges 51a, 52a and the rear right edges 51b, 52b. The rear left edges 51a, 52a and the rear right edges 51b, 52b are respectively joined with each other and are disposed on the left and right sides of the connecting part 50a in the occupant side panel 50. Therefore, when the front side panel 55 is flattened and overlapped on the opened occupant side panel 50 whose rear left edges 51a, 52a and rear right edges 51b, 52b are joined to each other and the corresponding front edges 51c, 52c and the outer peripheral edge 55a are joined to each other, the bag main body 26 can be formed, so that the bag main body 26 can be manufactured easily by the planar joining operation. The bag main body 26 can be manufactured with two pieces of the occupant side panel 50 and the front side panel 55. Therefore, the bag main body 26, which includes few components and is inflated three-dimensionally into a substantially triangular prism shape, can be manufactured easily while an increase in the number of manufacturing steps and costs can be reduced or prevented.

Figure 11:
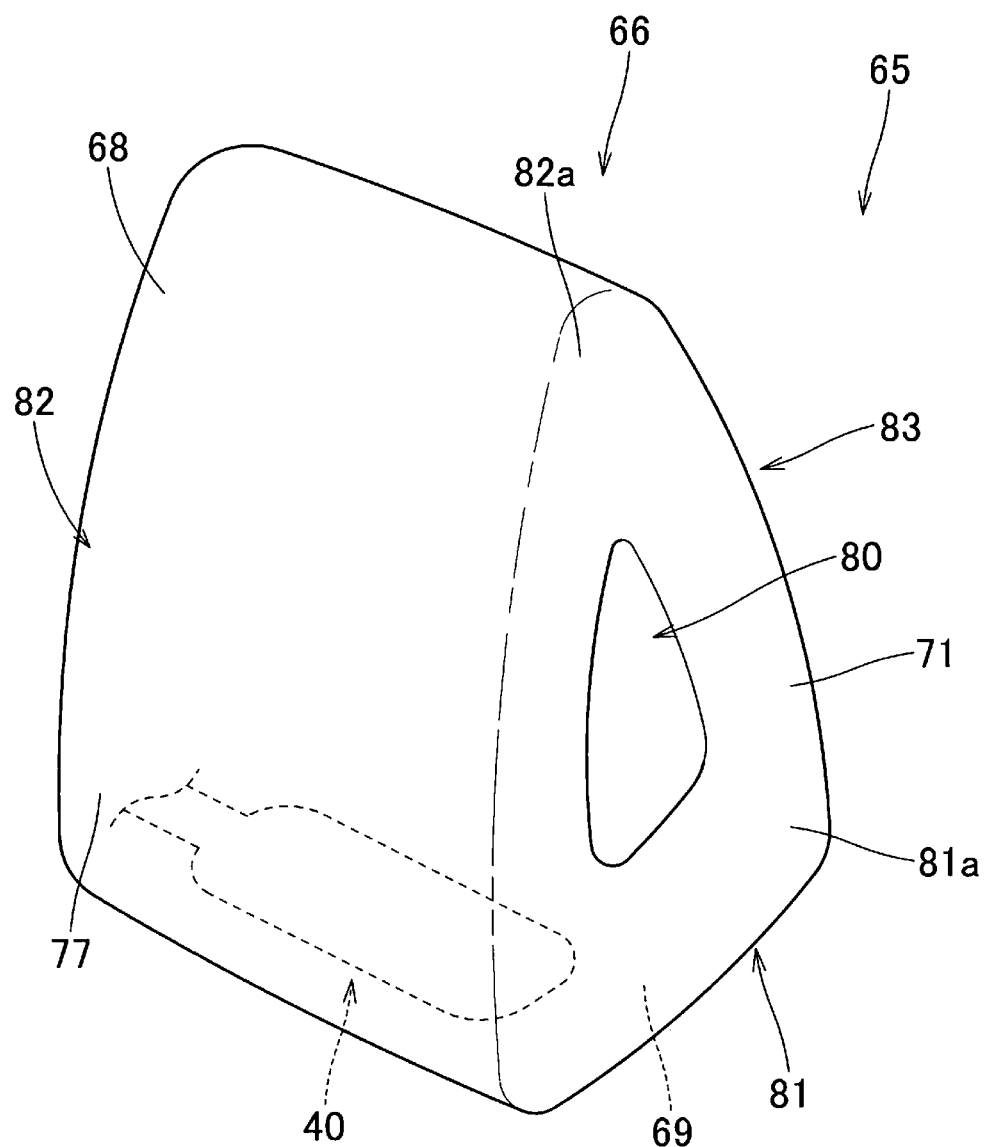
FIG. 11 is a schematic perspective view illustrating a state where an airbag according to another embodiment of the present invention is inflated alone.
Figure 12:
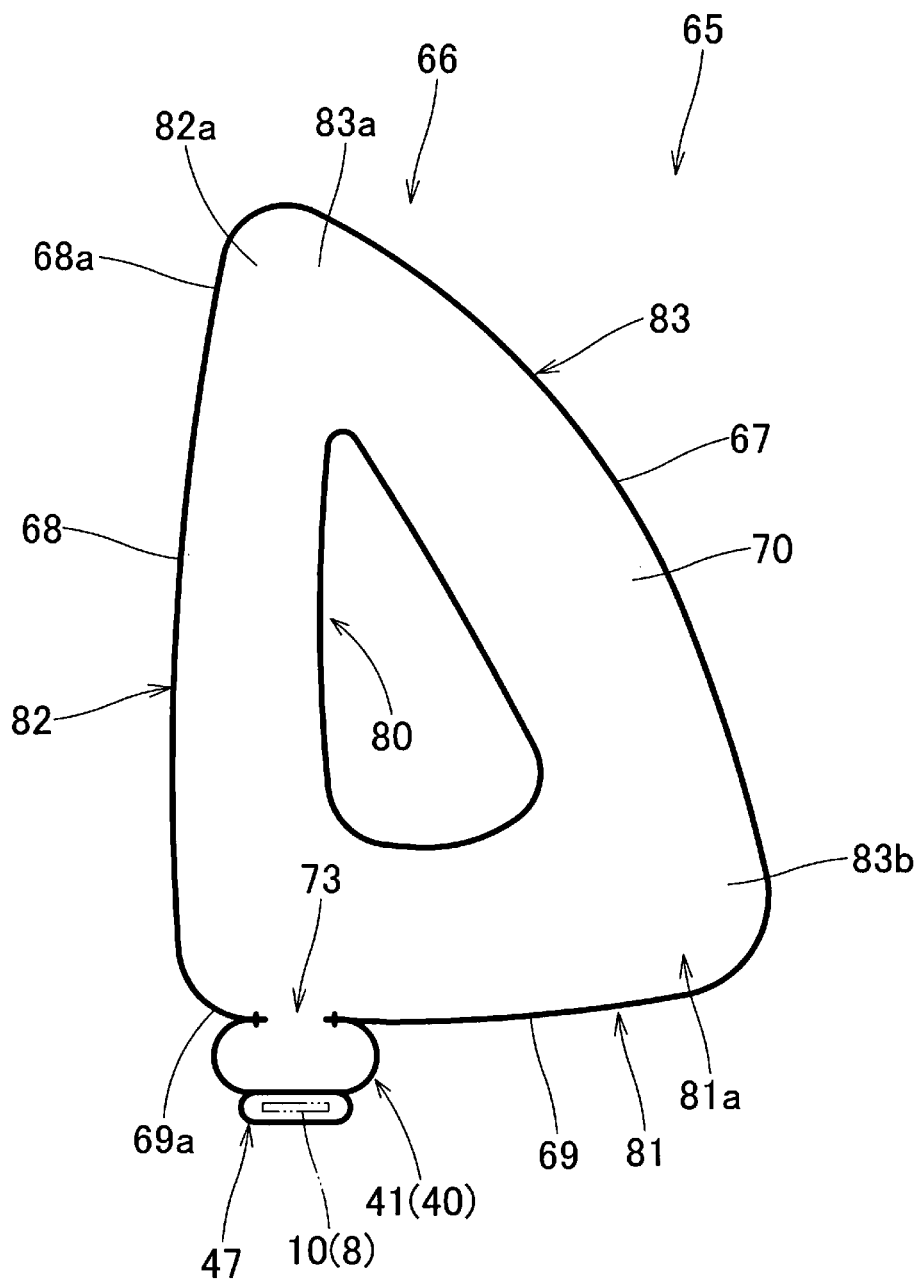
FIG. 12 is a schematic longitudinal sectional view of the airbag in FIG. 11.
Figure 13:
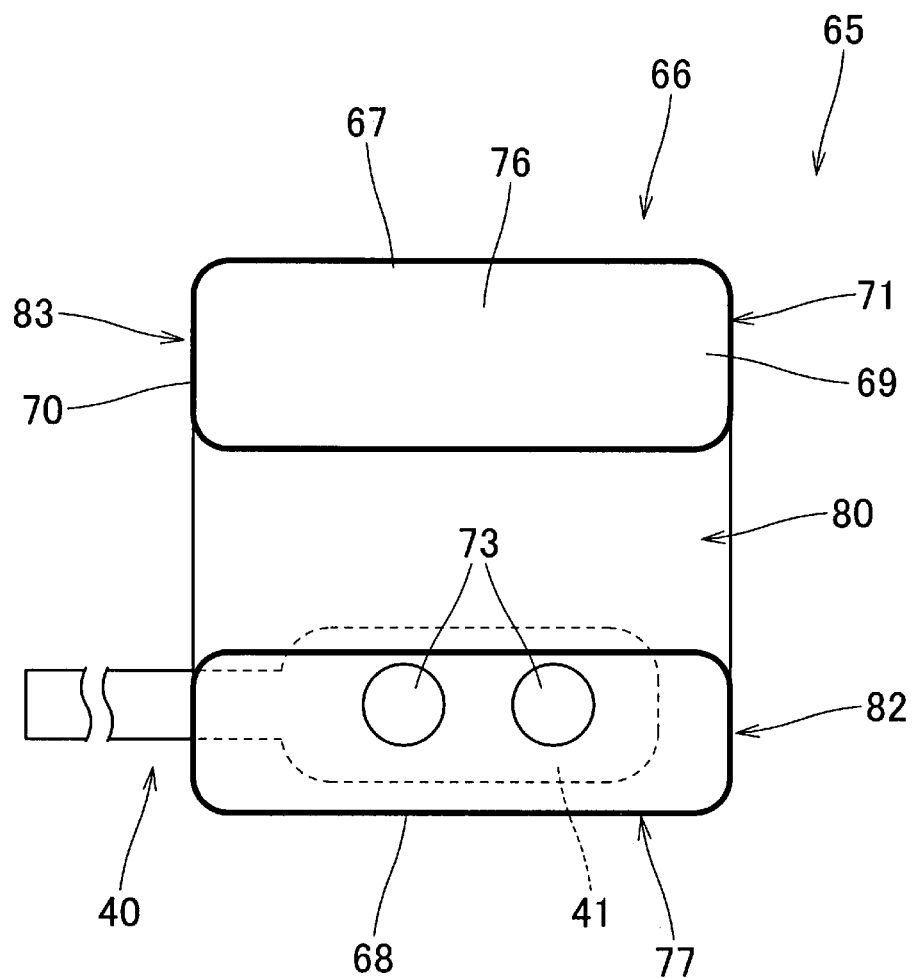
FIG. 13 is a schematic cross-sectional view of the airbag in FIG. 11.

An airbag 65 may have a configuration illustrated in FIGS. 11 to 13. The airbag 65 includes a bag main body 66, the conduit portion 40 which is connected to the inflator 17 to flow the inflation gas into the bag main body 66, and the belt attachment portion 47 through which the lap belt 10 is inserted. In the airbag 65, the conduit portion 40 and the belt attachment portion 47 have the same configurations as those of the above-described airbag 25, so that the same reference numerals are used and a detailed description thereof is omitted. Similar to the above-described airbag 25, the airbag 65 is formed of a flexible woven fabric formed of a polyester yarn, a polyamide yarn, or the like.

Figure 14:
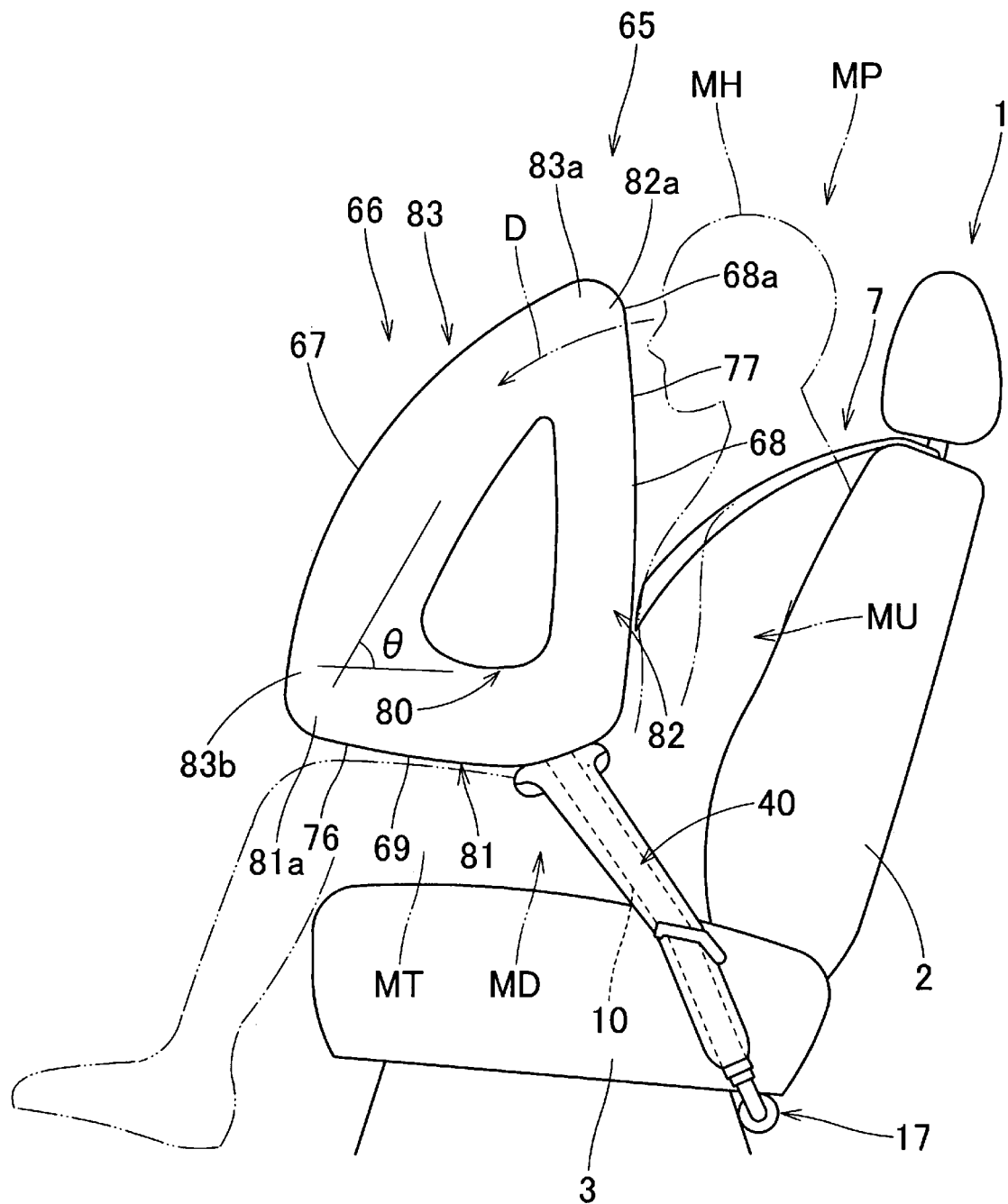
FIG. 14 is a side view of the seat in a state where inflation of the airbag in FIG. 11 is completed.

Similarly to the bag main body 26 of the above-described airbag 25, the bag main body 66 has a substantially triangular prism shape whose axial direction is substantially aligned with the left-right direction. As illustrated in FIGS. 12 and 14, the bag main body 66 has a substantially right-angled triangular shape having a hypotenuse on a front side as viewed from left and right sides when inflation of the bag main body 66 is completed. Although not illustrated in detail, the bag main body 66 has a substantially rectangular shape which is wider in the upper-lower direction as viewed form sides in a front-rear direction when the inflation of the bag main body 66 is completed, similarly to the bag main body 26 of the above-described airbag 25. The bag main body 66 includes a front wall portion 67 which is provided on a front side away from the occupant MP when the inflation of the bag main body 66 is completed, a rear upper wall portion 68 and a rear lower wall portion 69 which are provided on an occupant MP side when the inflation of the bag main body 66 is completed, and a left wall portion 70 and a right wall portion 71 which are provided to face each other on sides (sides of the seat 1 in a width direction) in the left-right direction when the inflation of the bag main body 66 is completed. Similarly to the bag main body 26 of the above-described airbag 25, the bag main body 66 includes communication holes 73 communicating with the conduit portion 40 on a lower surface side of a rear end 69a of the rear lower wall portion 69, and is connected to the conduit portion 40 at a peripheral part of the communication holes 73 (see FIG. 13). In the bag main body 66, the rear lower wall portion 69 forms a leg abutting surface 76 which can abut against an upper surface of a leg MT of the occupant MP when the inflation of the bag main body 66 is completed, and the rear upper wall portion 68 forms an upper body restraining surface 77 which is provided in front of the occupant MP when the inflation of the bag main body 66 is completed and can restrain a chest to a head of the occupant MP. The rear upper wall portion 68 is provided to be substantially aligned with the upper-lower direction when the inflation of the bag main body is completed, and is configured such that an upper end 68a side is positioned in front of a head MH of the occupant MP (see FIG. 14). The rear upper wall portion 68 and the rear lower wall portion 69 are provided to be substantially orthogonal to each other in a cross-sectional shape when the inflation of the bag main body 66 is completed (see FIG. 12).

The bag main body 66 has the substantially triangular prism shape when the airbag 65 is completely inflated, in detail, the bag main body 66 includes a through hole portion 80 which penetrates in the left-right direction at the completion of inflation of the airbag 65, and is configured such that an outer shape of the bag main body 66 as viewed from the left-right direction is a substantially triangular ring shape to surround a periphery of the through hole portion 80 by a leg side inflation portion 81 provided on a leg abutting surface 76 side, an upper body side inflation portion 82 provided on an upper body restraining surface 77 side, and a front side inflation portion 83 provided to connect the leg side inflation portion 81 and the upper body side inflation portion 82 (see FIGS. 11, 12, and 14). The through hole portion 80 is configured to penetrate entire left and right regions to open a left wall portion 70 side and a right wall portion 71 side (see FIG. 13). In the embodiment, as illustrated in FIGS. 12 and 14, an opening shape of the through hole portion 80 viewed from the left-right direction side is a substantially right-angled triangular shape which is substantially similar to an outer shape of the bag main body 66. The leg side inflation portion 81 provided on the leg abutting surface 76 side is formed to be substantially aligned with the leg abutting surface 76, and has a width dimension substantially constant over entire front and rear regions when the inflation of the bag main body 66 is completed. The upper body inflation portion 82 provided on the upper body restraining surface 77 side is formed to be substantially aligned with the upper body restraining surface 77, and has a width dimension substantially constant over entire upper and lower regions when the inflation of the bag main body 66 is completed. The upper body side inflation portion 82 is configured to receive the head MH of the occupant MH on an upper end 82a side thereof. The front side inflation portion 83 provided to connect the leg side inflation portion 81 and the upper body side inflation portion 82 is formed to be substantially aligned with the front wall portion 67, and has a width dimension substantially constant over an entire length when the inflation of the bag main body 66 is completed.

The front inflation portion 83 is configured to prevent the upper end 82a side of the upper body side inflation portion 82 from being closer to a front end 81a side of the leg side inflation portion 81 when the occupant MP is restrained at the completion of the inflation of the airbag 65. Specifically, in the embodiment, the front side inflation portion 83 is formed in a substantially linear shape (in a plate shape) toward a lower end 88b side to be substantially aligned with a moving direction D of the head MH of the occupant MP when an upper body MU of the occupant MP moves closer to the lower body MD while an upper end 83a connected to the upper end 82a side of the upper body side inflation portion 82 is positioned in front of the head MH at the completion of the inflation of the airbag 65 (see FIG. 14). The front side inflation portion 83 has a width dimension (a thickness) at the completion of the inflation of the airbag 65 which is slightly larger (thicker) than thickness dimensions (thicknesses) of the leg side inflation portion 81 and the upper body side inflation portion 82 at the completion of the inflation of the airbag 65 (see FIG. 12). An intersection angle θ (see FIG. 14) of the front side inflation portion 83 to a horizontal direction in a state where the airbag 65 is mounted on the vehicle is set to about 60°. The intersection angle of the front side inflation portion 83 to the horizontal direction is preferably set to an angle such that a bending deformation of the front side inflation portion 83 due to a pressing force acting on the upper end 82a side of the upper body side inflation portion 82 can be prevented at a time of receiving the upper body MU of the occupant MP by the upper body side inflation portion 82 and that the front side inflation portion 83 can be compressively deformed, and specifically, is preferably set within a range of 60° to 70°.

Figure 15:
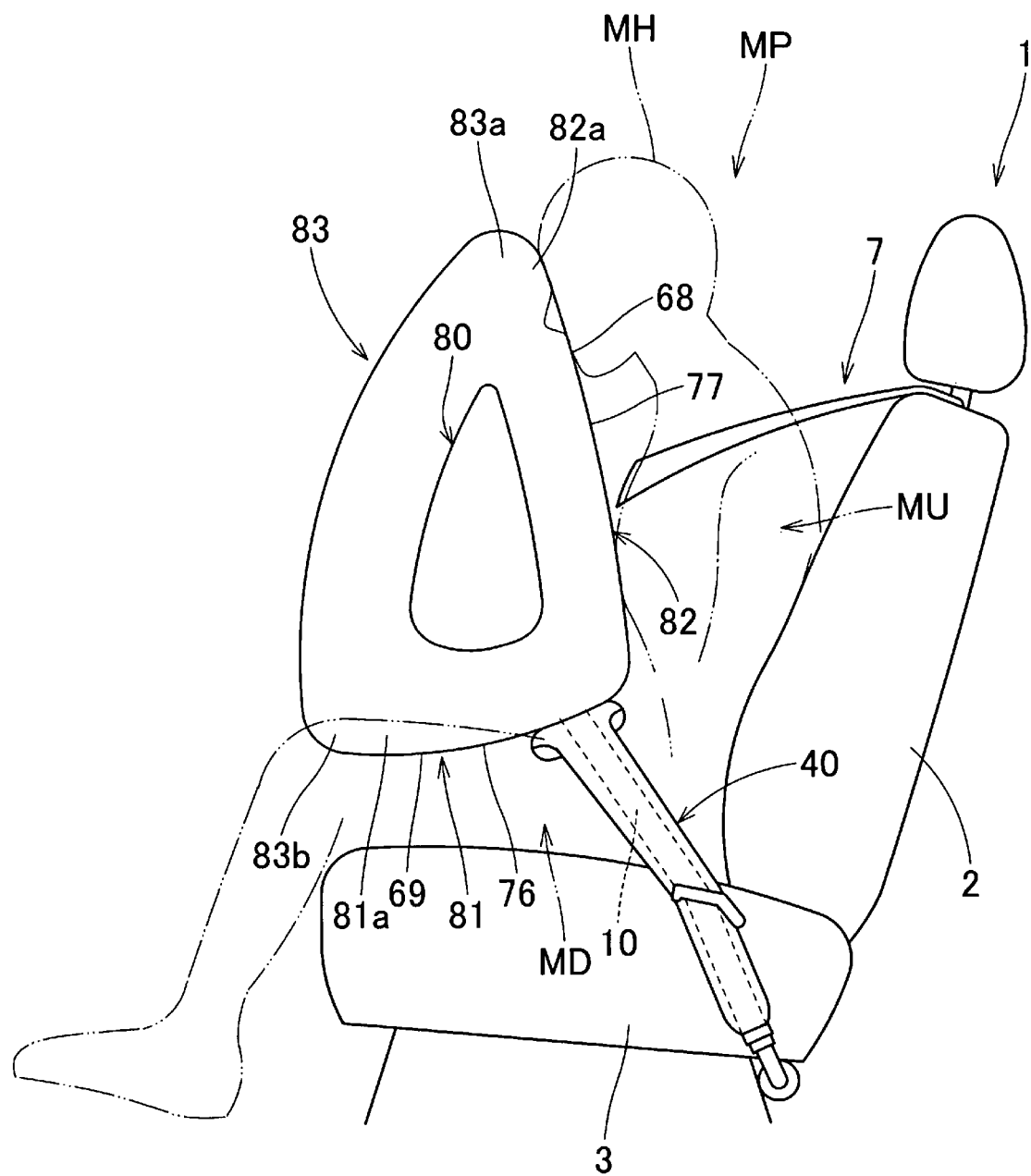
FIG. 15 is a side view illustrating a state where an occupant is restrained by the airbag in FIG. 11.

When the airbag 65 having this configuration is used, the airbag 65 (the bag main body 66) has a substantially triangular prism shape whose axial direction is substantially aligned with the left-right direction when the airbag 65 is completely inflated, and is provided on a front side of the upper body MU of the occupant MP while abutting the leg abutting surface 76 with an upper surface of the leg MT. Therefore, when the inflation of the airbag 65 is completed, as illustrated in FIG. 15, even if the upper body MU of the occupant MP largely moves closer to the lower body MD, the leg abutting surface 66 is supported by the leg MT in a large area. Accordingly, falling or compressing of the airbag 65 can be prevented, and the upper body MU (from the chest MB to the head MH) of the occupant MP can be accurately restrained by the upper body restraining surface 77 provided to face the front side of the upper body MU. The airbag 65 (the bag main body 66) has a substantially triangular prism shape when the inflation of the airbag 65 is completed. Accordingly, the upper body MU can be accurately restrained by the upper body restraining surface 77 even when the occupant MP is seated on a seat with a backrest portion thereof being inclined.

Therefore, when the airbag 65 having the above-described configuration is used, the upper body MU of the occupant MP can be accurately protected by the airbag 65 that is completely inflated even when the upper body MU is moved largely to approach the lower body MD.

The airbag 65 having the above-described configuration is formed with the through hole portion 80 which penetrates in the left-right direction at the completion of inflation of the airbag 65 so as to reduce a volume of the airbag 65. Accordingly, as compared to the above-described airbag 25, the volume can be reduced, the inflator to be used can be reduced in size, and the airbag 65 can be inflated rapidly.

The airbag 65 having the above-described configuration is configured such that the outer shape of the bag main body 66 as viewed from the left-right direction side is a substantially triangular ring shape to surround the periphery of the through hole portion 80 by the leg side inflation portion 81 provided on the leg abutting surface 76 side, the upper body side inflation portion 82 provided on the upper body restraining surface 77 side, and the front side inflation portion 83 provided to connect the leg side inflation portion 81 and the upper body side inflation portion 82. The upper body side inflation portion 82 is configured to receive the head MH of the occupant MH on the upper end 82a side thereof. In the airbag 65, the front inflation portion 83 is configured to prevent the upper end 82a side of the upper body side inflation portion 82 from being closer to the front end 81a side of the leg side inflation portion 81 when the occupant MP is restrained. Therefore, when the upper body MU of the occupant MP largely moves closer to the lower body MD of the occupant MP at the completion of the inflation of the airbag 65, a behavior that the upper body side inflation portion 82 falls down toward the leg side inflation portion 81 as the upper body MU moves can be restricted by the front side inflation portion 83. The leg side inflation portion 81 is supported by the leg MT in a large area, so that the upper body MU of the occupant MP including the head MH can be accurately restrained by the upper body side inflation portion 82. Specifically, in the embodiment, the front side inflation portion 83 is thicker than the leg side inflation portion 81 and the upper body side inflation portion 82, and the front side inflation portion 83 is formed in a substantially linear shape toward the lower end 88b side to be substantially aligned with the moving direction D of the head MH of the occupant MP when the upper body MU of the occupant MP moves closer to the lower body MD while the upper end 83a connected to the upper end 82a side of the upper body side inflation portion 82 is positioned in front of the head MH. Therefore, when the upper body MU of the occupant MP largely moves closer to the lower body MD of the occupant MP, if the head MH presses the upper end 83a side of the front side inflation portion 83 via the upper end 82a side of the upper body side inflation portion 82, the front side inflation portion 83 receives the pressing force of the head MH to prevent the bending deformation at an intermediate part in the upper-lower direction, and is compressed to be buckled and deformed while the upper end 83a side approaches the lower end 83b side. Therefore, the head MH of the occupant MP can be stably restrained by ensuring a high reaction force, and the entire upper body MU including the head MH can be stably restrained by the upper body side inflation portion 82.

According to an aspect of the invention, there is provided an occupant protection device which is configured to protect an occupant seated on a seat, the occupant protection device comprising: a seat belt; an airbag which is disposed in an area of a lap belt of a seat belt, the lap belt configured to restrain a waist of the occupant when being worn; and an inflator which is configured to supply inflation gas to the airbag, wherein the airbag has a bag shape formed of a flexible sheet body, the airbag is folded and stored in a storage part provided in the lap belt, the airbag is inflated so as to project toward a front upper side when the inflation gas flows into the airbag, and the airbag has a substantially triangular prism shape whose axial direction is substantially aligned with a left-right direction so as to include a leg abutting surface which is capable of abutting an upper surface of a leg of the occupant and an upper body restraining surface which is capable of restraining the occupant from a chest to a head, when the airbag is completely inflated.

In the occupant protection device according to the present invention, the airbag has a substantially triangular prism shape whose axial direction is substantially aligned with the left-right direction when the airbag is completely inflated, and is disposed on a front side of the upper body of the occupant while abutting the leg abutting surface with an upper surface of a leg. Therefore, when the airbag is completely inflated, even if the upper body of the occupant largely moves closer to the lower body, the leg abutting surface is supported by the leg in a large area. Therefore, falling or compression of the airbag can be reduced or prevented, and the upper body (from the chest to the head) of the occupant can be accurately restrained by the upper body restraining surface disposed to face the front side of the upper body.

Therefore, in the occupant protection device according to the present invention, the upper body of the occupant can be accurately protected by the airbag that is completely inflated even when the upper body is moved largely so as to approach the lower body.

In the occupant protection device according to the present invention, a configuration, in which the seat belt and the inflator are mounted on the seat, is preferable since, for example, the occupant seated on the seat can be protected accurately even when the seat is slid or rotated largely in the front-rear direction and is moved relative to the vehicle.

The inflator may be disposed at a position below a seat surface of the seat, and the airbag may include a bag main body and a conduit portion which is connected to the inflator to flow the inflation gas into the bag main body.

The conduit portion may include a gas storage portion which is capable of temporarily storing the inflation gas flowing into the gas storage portion, and which is disposed in a leading end side of the conduit portion at a lower surface side of the bag main body when the airbag is completely inflated, and the gas storage portion and the bag main body may communicate with each other through a plurality of communication holes which are arranged in the left-right direction.

If the occupant protection device has the above-described configuration, the inflation gas stored in the gas storage portion flows into the bag main body at substantially the same time from the communication holes formed side by side in the left-right direction. Therefore, it is possible to reduce or prevent the bag main body from moving leftward and rightward and to inflate the bag main body rapidly.

The bag main body may have a bag shape by joining peripheral edges of an occupant side panel and a front side panel, the occupant side panel disposed on an occupant side when the airbag is completely inflated and forming a part from the leg abutting surface to the upper body restraining surface, the front side panel disposed on a front side when the airbag is completely inflated. The occupant side panel may include a lower side part which forms the leg abutting surface and has a substantially hexagonal shape, and an upper side part which forms the upper body restraining surface and has a substantially hexagonal shape, and the occupant side panel may have an outer shape such that one side of the lower side part and one side of the upper side part are connected. The front side panel may have an outer shape which is a substantially hexagonal shape that substantially matches the lower side part and the upper side part which are opened so as to separate edges except edges respectively joined with each other and disposed on left and right sides of a connecting part of the occupant side panel.

If the occupant protection device has the above-described configuration, when the front side panel is flattened and overlapped on the opened occupant side panel of which a part of edges are joined to each other and the corresponding edges are joined to each other, the bag main body can be formed, so that the bag main body can be manufactured easily by the planar joining operation. The bag main body can be manufactured with two pieces of the occupant side panel and the front side panel. Therefore, the bag main body, which includes few components and is inflated three-dimensionally into a substantially triangular prism shape, can be manufactured easily while an increase in the number of manufacturing steps and costs can be reduced or prevented.

The airbag may be formed with a through hole portion, which penetrates in the left-right direction when the airbag is completely inflated, so as to reduce a volume of the airbag.

If the occupant protection device has the above-described configuration, the volume of the airbag can be reduced, the inflator to be used can be reduced in size, and the airbag can be inflated rapidly, so that the configuration is preferable.

An outer shape of the airbag as viewed from the left-right direction may be a substantially triangular ring shape to surround a periphery of the through hole portion by a leg side inflation portion provided on a side of the leg abutting surface, an upper body side inflation portion provided on a side of the upper body restraining surface, and a front side inflation portion provided to connect the leg side inflation portion and the upper body side inflation portion, the upper body side inflation portion may be configured to receive the head of the occupant on an upper end side thereof, and the front inflation portion may be configured to prevent the upper end side of the upper body side inflation portion from being closer to a front end side of the leg side inflation portion when the occupant is restrained.

If the airbag has the above-described configuration, when the upper body of the occupant largely moves closer to the lower body of the occupant at the completion of inflation of the airbag, a behavior that the upper body side inflation portion falls down toward the leg side inflation portion as the upper body moves can be restricted by the front side inflation portion. The leg side inflation portion is supported by a leg in a large area, so that the upper body of the occupant including the head can be accurately restrained by the upper body side inflation portion.

What is claimed is:

1. An occupant protection device which is configured to protect an occupant seated on a seat, the occupant protection device comprising:

a seat belt;

an airbag which is disposed in an area of a lap belt of a seat belt, the lap belt configured to restrain a waist of the occupant when being worn; and an inflator which is configured to supply inflation gas to the airbag, wherein the airbag has a bag shape formed of a flexible sheet body, the airbag is folded and stored in a storage part provided in the lap belt, the airbag is inflated so as to project toward a front upper side when the inflation gas flows into the airbag, and the airbag has a substantially triangular prism shape whose axial direction is substantially aligned with a left-right direction so as to include a leg abutting surface which is capable of abutting an upper surface of a leg of the occupant and an upper body restraining surface which is capable of restraining the occupant from a chest to a head, when the airbag is completely inflated, wherein the airbag includes a bag main body and a conduit portion which is connected to the inflator to flow the inflation gas into the bag main body, wherein the bag main body has a bag shape by joining peripheral edges of an occupant side panel and a front side panel, the occupant side panel disposed on an occupant side when the airbag is completely inflated and forming a part from the leg abutting surface to the upper body restraining surface, the front side panel disposed on a front side when the airbag is completely inflated, wherein the occupant side panel includes a lower side part which forms the leg abutting surface and has a substantially hexagonal shape, and an upper side part which forms the upper body restraining surface and has a substantially hexagonal shape, and the occupant side panel has an outer shape such that one side of the lower side part and one side of the upper side part are connected, wherein the front side panel has an outer shape which is a substantially hexagonal shape that substantially matches the lower side part and the upper side part which are opened so as to separate edges except edges respectively joined with each other and disposed on left and right sides of a connecting part of the occupant side panel, and wherein the occupant side panel and the front side panel are configured as separate panels.

2. The occupant protection device according to claim 1, wherein the seat belt and the inflator are mounted on the seat.

3. The occupant protection device according to claim 2, wherein the inflator is disposed at a position below a seat surface of the seat.

4. The occupant protection device according to claim 3, wherein the conduit portion includes a gas storage portion which is capable of temporarily storing the inflation gas flowing into the gas storage portion, and which is disposed in a leading end side of the conduit portion at a lower surface side of the bag main body when the airbag is completely inflated, and wherein the gas storage portion and the bag main body communicate with each other through a plurality of communication holes which are arranged in the left-right direction.

5. The occupant protection device according to claim 1, wherein the airbag is formed with a through hole portion, which penetrates in the left-right direction when the airbag is completely inflated, so as to reduce a volume of the airbag.

6. The occupant protection device according to claim 5, wherein an outer shape of the airbag as viewed from the left-right direction is a substantially triangular ring shape to surround a periphery of the through hole portion by a leg side inflation portion provided on a side of the leg abutting surface, an upper body side inflation portion provided on a side of the upper body restraining surface, and a front side inflation portion provided to connect the leg side inflation portion and the upper body side inflation portion, wherein the upper body side inflation portion is configured to receive the head of the occupant on an upper end side thereof, and wherein the front inflation portion is configured to prevent the upper end side of the upper body side inflation portion from being closer to a front end side of the leg side inflation portion when the occupant is restrained.

* * * * *